United States Patent
Liu et al.

(10) Patent No.: US 11,172,321 B2
(45) Date of Patent: Nov. 9, 2021

(54) METHOD AND DEVICE FOR CONTROLLING SOUND FIELD, AND STORAGE MEDIUM

(71) Applicant: BEIJING XIAOMI MOBILE SOFTWARE CO., LTD., Beijing (CN)

(72) Inventors: Li Liu, Beijing (CN); Shoujing Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/845,281

(22) Filed: Apr. 10, 2020

(65) Prior Publication Data

US 2021/0160649 A1    May 27, 2021

(30) Foreign Application Priority Data

Nov. 27, 2019   (CN) .......................... 201911184624.2

(51) Int. Cl.
| | |
|---|---|
| H04S 7/00 | (2006.01) |
| G06T 7/70 | (2017.01) |
| H04R 1/40 | (2006.01) |
| H04R 3/04 | (2006.01) |
| H04R 3/12 | (2006.01) |
| H04R 5/02 | (2006.01) |
| H04R 5/04 | (2006.01) |

(52) U.S. Cl.
CPC ................ *H04S 7/307* (2013.01); *G06T 7/70* (2017.01); *H04R 1/403* (2013.01); *H04R 3/04* (2013.01); *H04R 3/12* (2013.01); *H04R 5/02* (2013.01); *H04R 5/04* (2013.01)

(58) Field of Classification Search
None
See application file for complete search history.

(56) References Cited

U.S. PATENT DOCUMENTS

| | | | |
|---|---|---|---|
| 2016/0286331 A1* | 9/2016 | Murayama | .............. H04S 7/304 |
| 2017/0188171 A1* | 6/2017 | Ishida | ....................... G01S 7/54 |
| 2018/0338214 A1 | 11/2018 | Leuschner et al. | |

OTHER PUBLICATIONS

Supplementary European Search Report in the European application No. 20171563.8, dated Oct. 16, 2020.

* cited by examiner

*Primary Examiner* — Kenny H Truong
(74) *Attorney, Agent, or Firm* — Syncoda LLC; Feng Ma (57) ABSTRACT

A method, applied to a mobile terminal having at least two loudspeakers, includes: setting direction information of a target sound field; and determining filtering parameters of at least two filters according to the direction information. The filters have a one-to-one correspondence with the loudspeakers, and are configured to filter audio signals to be output. The audio signals are filtered using the filtering parameters, to at least adjust phases of the audio signals. The adjusted audio signals are output by the loudspeakers. After the audio signals output by the different loudspeakers are superimposed, the superimposed signal is consistent with a direction indicated by the direction information.

20 Claims, 8 Drawing Sheets

METHOD AND DEVICE FOR CONTROLLING SOUND FIELD, AND STORAGE MEDIUM

CROSS-REFERENCE TO RELATED APPLICATION

This application claims priority to Chinese Patent Application No. 201911184624.2 filed on Nov. 27, 2019, the disclosure of which is hereby incorporated by reference in its entirety.

BACKGROUND

A loudspeaker is a transducing device for converting an electrical signal into a sound signal. The loudspeaker is generally composed of a magnet, a frame, a spider and a tapered die-folding paper cone. Through an electromagnetic effect, a piezoelectric effect or an electrostatic effect, audio electric energy can cause the paper cone or a diaphragm to vibrate and resonate with surrounding air to produce a sound.

SUMMARY

The disclosure relates to the field of the communication technology, and specifically to a method and a device for controlling a sound field, and a storage medium.

In a first aspect of the embodiments of the disclosure, a method for controlling a sound field is provided. The method is applied to a mobile terminal which includes at least two loudspeakers. The method can include the following operations.

Direction information of a target sound field can be set.

Filtering parameters of at least two filters can be determined according to the direction information. The filters have a one-to-one correspondence with the loudspeakers, and are configured to filter audio signals to be output.

The audio signals are filtered using the filtering parameters, to at least adjust phases of the audio signals.

The adjusted audio signals are output by the loudspeakers. After the audio signals output by the different loudspeakers are superimposed, the superimposed signal is consistent with a direction indicated by the direction information.

In a second aspect of the embodiments of the disclosure, a device for controlling a sound field is provided. The device is applied to a mobile terminal which includes at least two loudspeakers. The device includes a processor, a memory configured to store instructions executable by the processor, and at least two filters.

The processor is configured to: set direction information of a target sound field; determine, according to the direction information, filtering parameters of at least two filters, the filters have a one-to-one correspondence with the loudspeakers, and are configured to filter audio signals to be output; enable the at least two filters to filter the audio signals using the filtering parameters, to at least adjust phases of the audio signals; and enable the at least two loudspeaker to output the adjusted audio signals, after the audio signals output by the different loudspeakers are superimposed, the superimposed signal is consistent with a direction indicated by the direction information.

In a third aspect of the embodiments of the disclosure, a non-transitory computer storage medium is provided, which include instructions, that when executed by a processor of a mobile terminal, enable the mobile terminal to execute operations of: setting direction information of a target sound field; determining, according to the direction information, filtering parameters of at least two filters, where the filters have a one-to-one correspondence with loudspeakers, and are configured to filter audio signals to be output; filtering the audio signals using the filtering parameters, to at least adjust phases of the audio signals; and outputting, by the loudspeakers, the adjusted audio signals, wherein after the audio signals output by the different loudspeakers are superimposed, the superimposed signal is consistent with a direction indicated by the direction information.

It is to be understood that the above general description and following detailed description are only exemplary and explanatory, and are not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Two loudspeakers are generally used in a mobile terminal to create an audio sense of a stereo, but a whole sound field is fixed and unable to move. In some application scenarios, the sound field of the loudspeaker needs to be produced towards a specific direction. For example, the sound field is directed to a direction of a person to enhance auditory experience.

Figure 1:
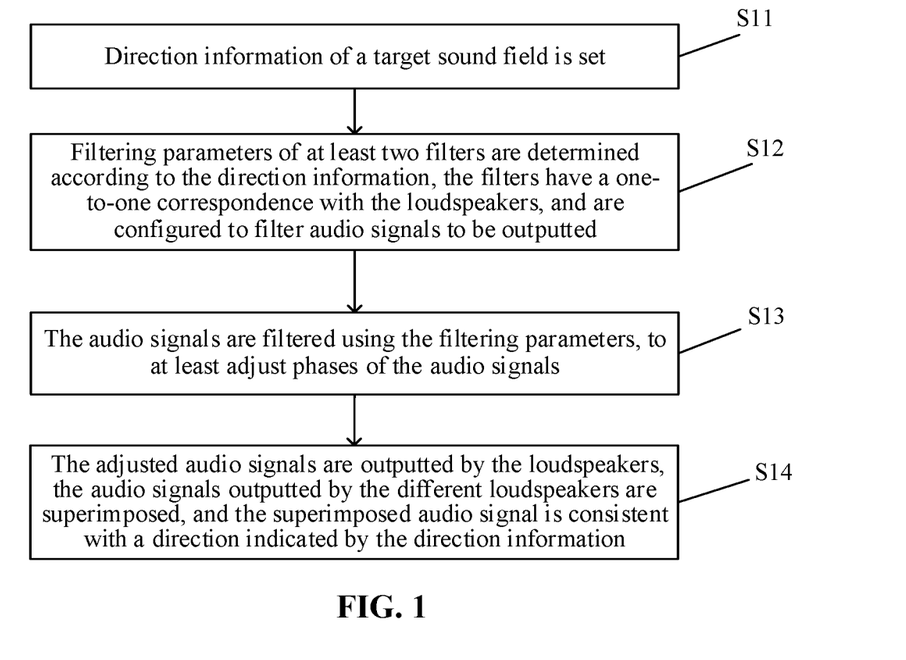
FIG. 1 is a flowchart of a method for controlling a sound field according to some embodiments of the present disclosure.

FIG. 1 is a flowchart of a method for controlling a sound field according to some embodiments of the present disclosure. As illustrated in FIG. 1, the method for controlling the sound field is applied to a mobile terminal which includes at least two loudspeakers. The method for controlling the sound field includes operations.

In S11, direction information of a target sound field is set.

In S12, filtering parameters of at least two filters are determined according to the direction information. The filters have a one-to-one correspondence with the loudspeakers, and are configured to filter audio signals to be output.

In S13, the audio signals are filtered using the filtering parameters, to at least adjust phases of the audio signals.

In S14, the adjusted audio signals are output by the loudspeakers. The audio signals output by the different loudspeakers are superimposed, and the superimposed signal is consistent with a direction indicated by the direction information.

In the embodiments of the disclosure, the mobile terminal includes a cellphone, a tablet computer, a wearable device and so on, which is not limited in the embodiments of the disclosure.

In S11, the mobile terminal sets the direction information of the target sound field according to a received instruction for characterizing the direction information. It is to be noted that the instruction is received through an operation of a user.

In some embodiments, the mobile terminal receives an operation instruction through a click or input operation of a user on a user interface, and sets the direction information of the target sound field.

In some embodiments, the mobile terminal receives an audio instruction sent by the user, and parses audio information of the audio instruction to set the direction information of the target sound field.

In some embodiments, the mobile terminal may also set the direction information of the target sound field according to a detected facial direction of a target object. The method can include operations as follows.

Image information can be first obtained.

A facial direction of the target object can be determined according to the image information.

S11 can include operations as follows.

The facial direction of the target object is set as the direction information of the target sound field.

In the embodiment, the mobile terminal includes an image collecting component, and the mobile terminal can collect the images by the image collecting component thereof, to obtain the image information. In another way, the mobile terminal obtains the image information through a connection with an external image collecting component.

The operation that the mobile terminal determines the facial direction of the target object according to the image information includes the following operations. The mobile terminal transmits the image information to a server side and receives the facial direction of the target object in the image information returned by the server side. An audio device performs parsing processing on the collected image information to determine the facial direction of the target object.

In the embodiments of the disclosure, the operation that the mobile terminal performs parsing processing on the image information to determine the facial direction includes the following operations. The mobile terminal detects a target face in the image information and recognizes the facial direction of the target face according to a face posture recognizing model which includes images of faces towards different directions.

In some implementations, the facial direction of the target face can also be determined according to a structural feature of five sense organs on the face after the target face is detected in the image information. Specifically, the method that the facial direction of the target face is determined according to the structural feature of the five sense organs on the face includes the following operations. The mobile terminal determines, according to the target face, a first distance between a first eye and a tip of a nose on the target face, and a second distance between a second eye and the tip of the nose on the target face, and the mobile terminal determines the facial direction of the target face according to the first distance and the second distance.

In the embodiments of the disclosure, if a built-in camera in the mobile terminal includes a front camera and a rear camera, the facial direction determined by the mobile terminal according to the image information obtained by the built-in camera is facial direction of the target object relative to the mobile terminal.

After obtaining the facial direction of the target object relative to the camera according to the obtained image information, the mobile terminal can calculate and obtain the facial direction of the target object relative to the mobile terminal according to the facial direction of the target object relative to the camera and a direction of the camera relative to the mobile terminal.

The facial orientation of the target object relative to the mobile terminal can be set as the direction information of the target sound field.

It is to be noted that in the embodiments of the disclosure, the direction information of the target sound field refers to a designated releasing direction, that is, a propagation direction, of sound. For example, the sound propagates in a designated direction which forms an angle of 30 degrees, 60 degrees, or the like, relative to a central axis of a plane in which the mobile terminal is located.

In some embodiments of the disclosure, filters of the mobile terminal have a one-to-one correspondence with loudspeakers. The filters are used to filter the audio signals, which includes filtering processing such as regulating frequencies, amplitudes, phases and the like of the audio signals, and further includes denoising processing on the audio signals. The filtered audio signals are output by the loudspeakers.

In some embodiments of the disclosure, the mobile terminal determines filtering parameters of at least two filters according to the direction information, and filter the audio signals according to the filtering parameters, to at least adjust the phases of the audio signals. As a result, after the filtered audio signals output by the at least two loudspeakers can be superimposed, the superimposed signal is consistent with a direction indicated by the direction information.

It is to be noted that in the embodiments of the disclosure, the operation that the filtering parameters of the at least two filters are determined according to the direction information of the target sound field further includes an operation that the filtering parameters of the filters are controlled to enable the loudspeaker corresponding to the filter not to output the audio signal. For example, when one filter performs denoising processing on the audio signal, the filter filters out the audio signal which is taken as noise.

With taking a cellphone as an example, eight loudspeakers are installed on the cellphone, that is, two loudspeakers are installed on each side of the cell phone. The cellphone may determine the parameters of the filters according to the direction information, to enable the four loudspeakers at the top side and the left side of the cell phone to output the audio signals while enabling the loudspeakers in other directions to not output the audio signals. This is because these audio signals of the loudspeakers in other directions are filtered out as the noise by the filters corresponding to the loudspeakers.

It can be understood that in the embodiments of the disclosure, the direction of the target sound field can be adjusted more accurate as the number of the filters and the loudspeakers increases.

Figure 2:
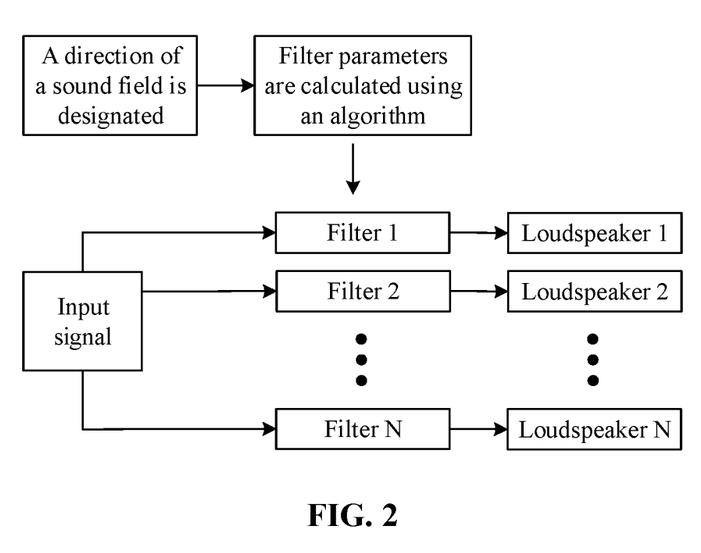
FIG. 2 is a schematic diagram of an architecture of a method for controlling a sound field according to some embodiments of the present disclosure.

Exemplarily, FIG. 2 is a schematic diagram of an architecture of a method for controlling a sound field according to some embodiments of the present disclosure. As illustrated in FIG. 2, a mobile terminal includes a filter 1 to a filter N, and a loudspeaker 1 to a loudspeaker N corresponding to the filter 1 to the filter N. After determining a designated direction of a sound field, the mobile terminal calculates filtering parameters of the filters according to an algorithm. The audio signals to be output are input signals of the filter 1 to the filter N. The filter 1 to the filter N filter the input signals using the parameters of the filters obtained according to the designated direction of the sound field, and the filtered signals are output by the loudspeaker 1 to the loudspeaker N corresponding to the filters, so that the superimposed signal propagates in the designated direction.

In some embodiments of the disclosure, the operation that the mobile terminal determines the filtering parameters of at least two filters according to direction information includes the following operation. The mobile terminal determines time delays of the at least two filters according to the direction information, to perform delay processing on the audio signals inputted into the at least two filters.

In some embodiments, the operation S12 includes the operation as follows.

The mobile terminal filters the audio signals according to the time delays, to at least adjust phases of the audio signals.

In this embodiment, it can be understood from a perspective of a time domain that occurrence time of wave peaks and wave troughs in the audio signals output by the loudspeakers can be controlled, since the mobile terminal includes at least two filters, and the time delays of the filters may affect the phases of the audio signals. When the audio signals which are filtered by different filters and output by the loudspeakers are superimposed in the air, the wave peaks are superimposed to form a sound field in a designated direction, that is, obtain a target sound field. The wave peak is superimposed with the wave trough to offset each other in a non-designated direction, so that no sound field is formed or the sound field is weakened after the superimposing.

As a result, in the embodiment, by regulating the time delay, the audio signals output by the different loudspeakers have wave peaks superimposed in a direction of the target sound field and have wave peaks superimposed with wave troughs in a direction other than the direction of the target sound field, to control the direction of the sound field.

In some embodiments, the operation S12 includes an operation as follows.

The mobile terminal constructs an optimization function with taking the direction information as an optimization target and taking the filtering parameters of the at least two filters as optimization variables, and regulates the filtering parameters of the at least two filters according to the optimization function.

In the embodiments of the disclosure, in addition to the above regulation of the time delays to implement a phase rotation, the optimization function can also be constructed according to an optimization theory such as a convex optimization theory. According to the theory, the optimization function is constructed with taking the direction information as the optimization target and taking the filtering parameters as the optimization variables, and the filtering parameters of the at least two filters are adjusted according to the constructed optimization function.

In some embodiments, the operation S13 includes an operation as follows.

The mobile terminal filters the audio signals using the filtering parameters, to adjust the wave peaks of the audio signals to superimpose in the direction indicated by the direction information, and adjust the wave peaks and the wave troughs to superimpose in a direction other than the direction indicated by the direction information to reduce an intensity of the signals.

In the embodiment, the phases of the audio signals can be adjusted by the regulation based on the parameters of the filters such as the above-mentioned regulation of the time delays of the filters, so that the intensity of the signals gets strong after the wave peaks are superimposed in the direction indicated by the direction information while the intensity of the signals gets weak after the wave peaks and the wave troughs are superimposed in a direction other than the direction indicated by the direction information. In other words, the sound is loud in the target sound field indicated by the direction information, and is small in the direction other than the direction indicated by the direction information.

In some embodiments, the operation S12 includes the following operation.

The mobile terminal filters the audio signals using the filtering parameters, to adjust the phases and amplitudes of the audio signals.

In some embodiments, the operation that the mobile terminal filters the audio signals using the filtering parameters to adjust the phases and the amplitudes of the audio signals includes the following operation.

The audio signals are filtered using the filtering parameters, to adjust wave peaks of the audio signals to superimpose in the direction indicated by the direction information, and adjust wave peaks and wave troughs to superimpose in the direction other than the direction indicated by the direction information to offset each other.

In the embodiment, not only the phases but also the amplitudes of the audio signals are adjusted. Specifically, the regulation based on the phases can make the wave peaks superimpose to increase, and also make the wave peaks and the wave troughs superimpose. The regulation based on amplitudes can make the wave peaks and the wave troughs superimpose to offset each other, so that no sound field exists in the direction other than the direction indicated by the direction information and the sound in the direction indicated by the direction information becomes outstanding.

It can be seen that in the embodiments of the disclosure, by regulating the phases and the amplitudes of the audio signals, the target sound field can be formed in the direction indicated by the direction information more accurate while no sound field exists in the direction other than the direction indicated by the direction information.

In some embodiments, four or more loudspeakers are disposed around the mobile terminal.

Exemplarily, four loudspeakers are included in the mobile terminal and are disposed at the periphery, and a same distance is formed between any two adjacent loudspeakers.

In the embodiment, the target sound field in more directions can be adjusted in the mobile terminal by disposing the loudspeakers at the periphery of the mobile terminal. For example, if the mobile terminal is a cellphone, the loudspeakers are disposed on the periphery of the cellphone to adjust the audio signals output in four directions, so that the directions in which the regulation can be performed cover a broad scope. In addition, the same distance is formed between any two adjacent loudspeakers. For example, any one of the loudspeakers is arranged in the middle of one edge of the cellphone. With constraint based on the symmetric position relationship, it is more convenient to determine the parameters of the filters.

It is to be noted that in the embodiments of the disclosure, the at least two loudspeakers are not limited to the four loudspeakers in the embodiments, and the arrangement positions of the loudspeakers in the mobile terminal are not limited to the above way.

In the embodiments of the disclosure, the mobile terminal includes at least two filters including a finite impulse response (FIR) filter.

The FIR filter has a linear phase. That is, many passband signals are inputted in the FIR filter simultaneously, and are output simultaneously after a period of time. The FIR filter is easy to be designed. Due to the advantages of the FIR filter, the FIR filter is suitable for an audio application.

In the embodiment of the disclosure, based on the advantage of the linear phase of the FIR filter, the FIR filter can be used to control the phase of the audio signal accurately, so that the target sound field is formed in the designated direction accurately.

It can be understood that in the embodiments of the disclosure, after setting the direction information of the target sound field, the mobile terminal can determine the filtering parameters of the at least two filters according to the direction information to at least adjust the phases of the audio signals, so that the sound field formed by superimposing the audio signals output by the different loudspeakers in the air is consistent with the direction indicated by the direction information, thereby implementing the control of the sound field and improving an user's auditory experience.

Figure 3:
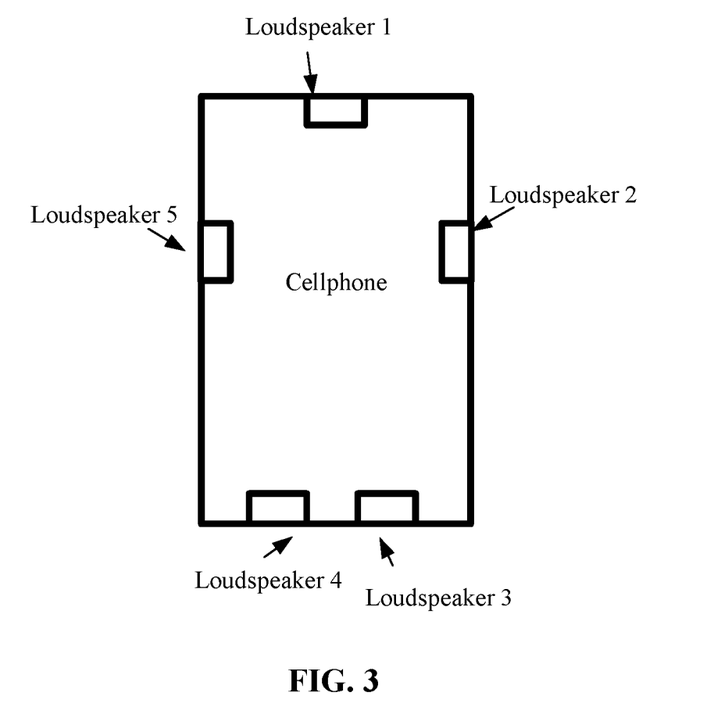
FIG. 3 is an exemplary orientation diagram of disposition of loudspeakers in a cell phone according to some embodiments of the present disclosure.

FIG. 3 is an exemplary orientation diagram of disposition of loudspeakers in a cellphone according to some embodiments of the present disclosure. As illustrated in FIG. 3, loudspeakers are disposed on four directions of the cell phone. One loudspeaker is disposed on each of a top side, a left side and a right side of the cellphone while two loudspeakers are disposed with an interval at the bottom of the cellphone. As a result, five loudspeakers including a loudspeaker 1, a loudspeaker 2, a loudspeaker 3, a loudspeaker 4 and a loudspeaker 5 are disposed in the cellphone.

Figure 4:
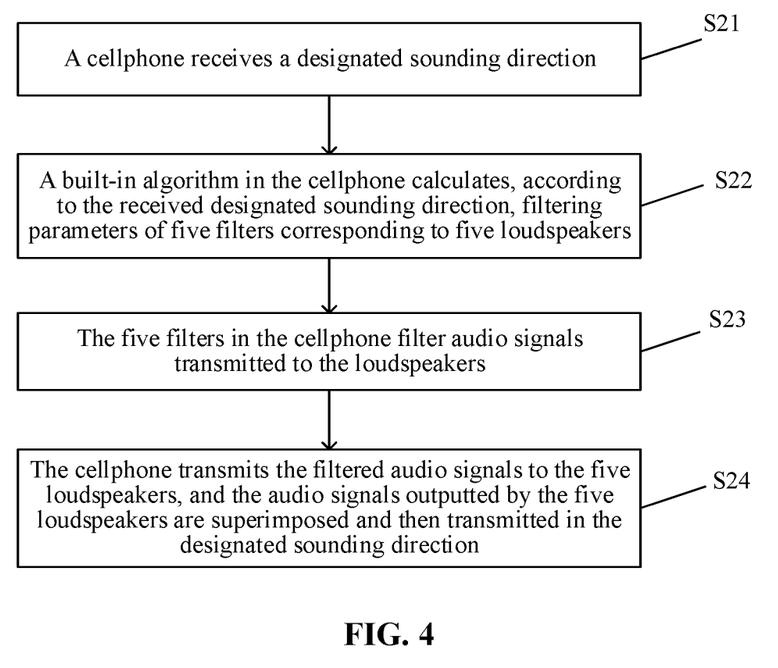
FIG. 4 is a first exemplary flowchart of a method for directionally controlling a sound field on the cellphone illustrated in FIG. 3 using multiple loudspeakers according to some embodiments of the present disclosure.

FIG. 4 is a first exemplary flowchart of a method for directionally controlling a sound field on the cellphone illustrated by FIG. 3 using multiple loudspeakers according to some embodiments of the present disclosure. As illustrated in FIG. 4, the method for controlling the sound field of the loudspeakers of the cellphone includes operations as follows.

In S21, the cellphone receives a designated sounding direction.

In this embodiment, the cellphone can set direction information of a target sound field according to the received designated sounding direction.

In S22, a built-in algorithm in the cellphone calculates filtering parameters of five filters corresponding to five loudspeakers according to the designated sounding direction.

In this embodiment, the built-in algorithm in the cellphone may be the above convex optimization algorithm.

In S23, the five filters in the cellphone filters audio signals to be transmitted to the loudspeakers.

In S24, the cellphone transmits the filtered audio signals to the five loudspeakers, and the audio signals output by the five loudspeakers are superimposed and then propagated in the designated sounding direction.

In this embodiment, after receiving the designated sounding direction, the cellphone can adjust the filtering parameters of the five filters according to the designated sounding direction, and the five filters filter the audio signals according to the adjusted filtering parameters, and the filtered audio signals are output by the loudspeakers. As a result, the sound field formed by superimposing the audio signals output by the five loudspeakers in the air is consistent with a direction indicated by the direction information, thereby implementing the control of the direction of the sound field and improving a user's auditory experience.

Figure 5:
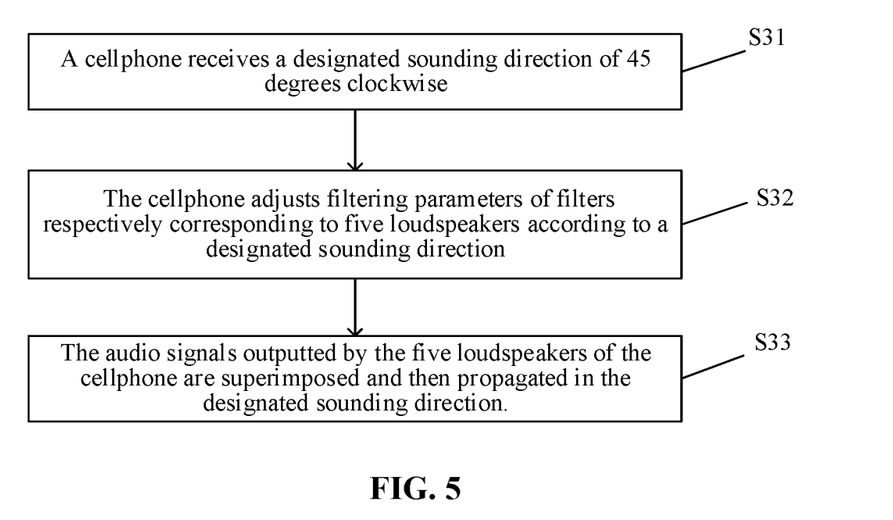
FIG. 5 is a second exemplary flowchart of a method for directionally controlling a sound field on the cellphone illustrated in FIG. 3 using multiple loudspeakers according to some embodiments of the present disclosure.

FIG. 5 is a second exemplary flowchart of a method for directionally controlling a sound field on the cellphone illustrated by FIG. 3 using multiple loudspeakers according to some embodiments of the present disclosure. As illustrated in FIG. 5, the method for controlling the sound field of the loudspeakers of the cellphone includes operations as follows.

In S31, the cellphone receives a designated sounding direction of 45 degrees clockwise.

Figure 6:
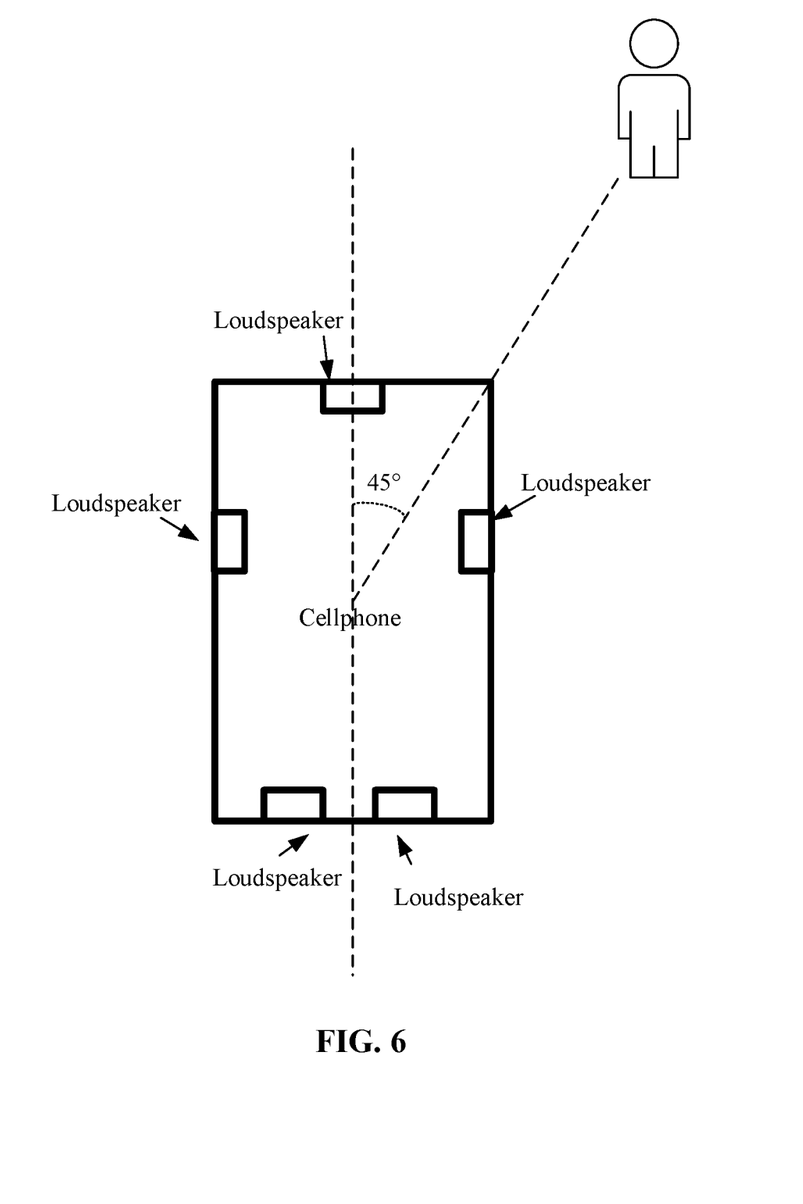
FIG. 6 is a schematic diagram of a direction of a person relative to a cellphone according to some embodiments of the present disclosure.

FIG. 6 is a schematic diagram of a direction of a person relative to a cellphone according to some embodiments of the present disclosure. As illustrated in FIG. 6, a sounding direction of 45 degrees refers to that an angle between a person and a vertical central axis of a horizontal plane of the cellphone is 45 degrees.

In S32, the cellphone regulates filtering parameters of filters respectively corresponding with five loudspeakers according to a designated sounding direction.

Exemplarily, in the disposition of the loudspeakers illustrated in FIG. 3, the filtering parameter of the filter corresponding to the loudspeaker 1 on the top of the cellphone and the filtering parameter of the filter corresponding to the loudspeaker 2 on the right side of the cellphone are adjusted according to the designated sounding direction of 45 degrees. Amplitudes of audio signals are changed by the regulation of the filtering parameters, so that volumes of the audio signals output by the loudspeaker 1 and the loudspeaker 2 are equal to a median value in a volume regulation range. Also, volumes of the audio signals output by other loudspeakers are reduced to a minimal value in the volume regulation range by controlling the filtering parameters corresponding to other loudspeakers according to the designated sounding direction of 45 degrees.

In S33, the audio signals output by the five loudspeakers of the cellphone are superimposed and then propagated in the designated sounding direction.

It is to be noted that, in the embodiment, the volumes of the audio signals output by the loudspeaker 3 to the loudspeaker 5 have been reduced to the minimal value after the audio signals are filtered by the filters. Therefore, intensities of the sounds propagated at angles corresponding to the loudspeaker 3 to the loudspeaker 5 are small while the sound emitted by the loudspeaker 1 and the loudspeaker 2 are superimposed in the air to make people feel that the sound come from the designated direction.

In this embodiment, upon receiving the designated sounding direction, the cellphone can adjust the volumes of the sounds of the loudspeakers in different directions according to the sounding direction, and the sound are superimposed to obtain the sound field consistent with the designated sounding direction. It can be seen that a user's auditory experience can also be improved with the method for controlling the volumes of the loudspeakers in different directions.

Figure 7:
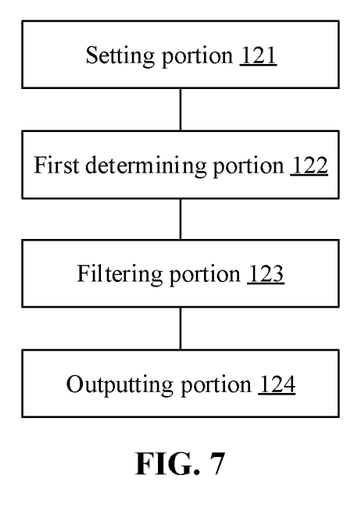
FIG. 7 is a diagram of a device for controlling a sound field according to some embodiments of the present disclosure.

FIG. 7 is a diagram of a device for controlling a sound field according to some embodiments of the disclosure. Referring to FIG. 7, the device for controlling the sound field includes a setting portion 121, a first determining portion 122, a filtering portion 123 and an outputting portion 124.

The setting portion 121 is configured to set direction information of a target sound field.

The first determining portion 122 is configured to determine, according to the direction information, filtering parameters of at least two filters. The filters have a one-to-one correspondence with the loudspeakers, and are configured to filter audio signals to be output.

The filtering portion 123 is configured to filter the audio signals using the filtering parameters, to at least adjust phases of the audio signals.

The outputting portion 124 is configured to output, by the loudspeakers, the adjusted audio signals. After the audio signals output by the different loudspeakers are superimposed, the superimposed signal is consistent with a direction indicated by the direction information.

In some embodiments, the first determining portion 122 is configured to determine, according to the direction information, time delays of the at least two filters, to perform delay processing on the audio signals inputted into the at least two filters.

In some embodiments, the filtering portion 123 is configured to filter, according to the time delays, the audio signals to at least adjust the phases of the audio signals.

In some embodiments, the first determining portion 122 is configured to construct an optimization function with taking the direction information as an optimization target and taking the filtering parameters of the at least two filters as optimization variables, and determine the filtering parameters of the at least two filters according to the optimization function.

In some embodiments, the filtering portion 123 is configured to filter the audio signals using the filtering parameters, to adjust wave peaks of the audio signals to superimpose in the direction indicated by the direction information, and adjust the wave peaks and wave troughs of the audio signals to superimpose in a direction other than the direction indicated by the direction information to reduce an intensity of the signals.

In some embodiments, the filtering portion 123 is configured to filter the audio signals using the filtering parameters, to adjust the phases and amplitudes of the audio signals.

In some embodiments, the filtering portion 123 is configured to filter the audio signals using the filtering parameters to adjust wave peaks of the audio signals to superimpose in the direction indicated by the direction information, and adjust the wave peaks and wave troughs to superimpose in a direction other than the direction indicated by the direction information to offset each other.

In some embodiments, four or more loudspeakers are disposed around the mobile terminal.

In some embodiments, the filtering portion may be the filter, a filtering unit or a filtering component.

In some embodiments, the filters include a FIR filter.

In some embodiments, the device further includes an obtaining portion 125 and a second determining portion 126.

The obtaining portion 125 is configured to obtain image information.

The second determining portion 126 is configured to determine, according to the image information, a facial direction of a target object.

The setting portion 121 is configured to set the facial direction of the target object as the direction information of the target sound field.

A way of performing operations by each portion of the device in the above embodiments has been described in detail in the embodiments of the method and will not be elaborated herein.

Figure 8:
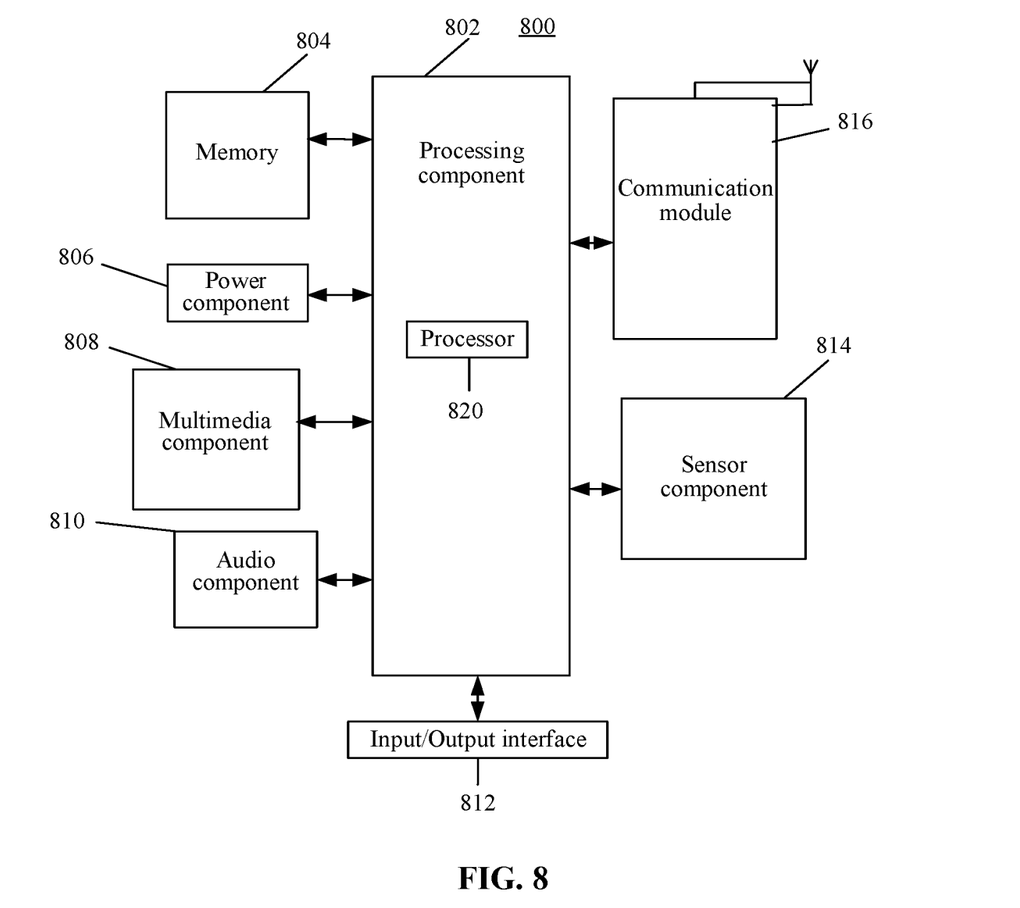
FIG. 8 is a block diagram of a mobile terminal according to some embodiments of the present disclosure.

FIG. 8 is a structure block diagram of a mobile terminal device 800 according to some embodiments. For example, the device 800 may be a mobile phone, a mobile computer, and so on.

Referring to FIG. 8, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 is typically configured to control overall operations of the device 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 is configured to provide power for various components of the device 800. The power component 806 may include a power management system, one or more power supplies, and other components associated with generation, management and distribution of power for the device 800.

The multimedia component 808 includes a screen for providing an output interface between the device 800 and a user. In some examples, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 808 may include a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the terminal is in the operation mode, such as a call mode, a recording mode and a voice recognition mode. The received audio signal may further be stored in the memory 804 or transmitted through the communication component 816. In some examples, the audio component 810 may further include a speaker configured to output the audio signal.

The I/O interface 812 is configured to provide an interface between the processing component 802 and a peripheral interface module, and the peripheral interface module may be a keyboard, a click wheel, a button and the like. The button may include, but not limited to: a home button, a volume button, a starting button and a locking button.

The sensor component 814 may include one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 100, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging APP. In some examples, the sensor component 814 may also include an acceleration sensor, a gyroscope sensor, a magnetic sensor, a pressure sensor or a temperature sensor.

The communication component 816 is configured to facilitate wired or wireless communication between the device 800 and other equipment. The device 800 may access a communication-standard-based wireless network, such as a Wireless Fidelity (Wi-Fi) network, a 2nd-Generation (2G), 3rd-Generation (3G), 4th-Generation (4G), or 5th-Generation (5G) network, or a combination thereof. In some embodiments of the present disclosure, the communication component 816 is configured to receive a broadcast signal or broadcast associated information from an external broadcast management system through a broadcast channel. In some embodiments, the communication component 816 may further include a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, a non-transitory computer-readable storage medium including instructions is further provided, such as the memory 804 including instructions. The instructions can be executed by the processor 820 of the device 800 to implement the abovementioned method. For example, the non-transitory computer-readable storage medium may be a read-only memory (ROM), a Compact Disc Read-Only Memory (CD-ROM), a magnetic tape, a floppy disc, an optical data storage device and the like.

The instructions in the non-transitory computer readable storage medium, when executed by a processor of a mobile terminal, enable the mobile terminal to perform the method for controlling a sound field. The method includes the following operations.

Direction information of a target sound field is set.

Filtering parameters of at least two filters are determined according to the direction information. The filters have a one-to-one correspondence with the loudspeakers, and are configured to filter audio signals to be output.

The audio signals are filtered using the filtering parameters to at least adjust phases of the audio signals.

The adjusted audio signals are output by the loudspeakers. After the audio signals output by the different loudspeakers are superimposed, the superimposed signal is consistent with a direction indicated by the direction information.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for controlling a sound field, executed by a mobile terminal having at least three loudspeakers and at least three filters, the method comprising:
   setting direction information of a target sound field;
   determining, according to the direction information, filtering parameters of at least three filters of the mobile terminal, wherein the at least three filters have a one-to-one correspondence with the at least three loudspeakers of the mobile terminal, and are configured to filter audio signals to be output;
   performing, by one of the at least three filters of the mobile terminal, denoising processing on the audio signal by controlling the filtering parameter of the filter, to enable the loudspeaker corresponding to the filter not to output the audio signal;
   filtering, by filters among the at least three filters other than the one filter, the audio signals using the filtering parameters, to at least adjust phases of the audio signals; and
   outputting, by the at least three loudspeakers of the mobile terminal, the adjusted audio signals, wherein the audio signals output by the at least three loudspeakers are superimposed, and the superimposed signal is consistent with a direction indicated by the direction information.

2. The method of claim 1, wherein the determining, according to the direction information, the filtering parameters of the at least three filters comprises:
   determining, according to the direction information, time delays of the at least three filters, to perform delay processing on the audio signals inputted into the at least three filters.

3. The method of claim 2, wherein the filtering, by filters among the at least three filters other than the one filter, the audio signals using the filtering parameters to at least adjust the phases of the audio signals comprises:
filtering, according to the time delays, the audio signals, to at least adjust the phases of the audio signals.

4. The method of claim 1, wherein the determining, according to the direction information, the filtering parameters of the at least three filters comprises:
constructing an optimization function with taking the direction information as an optimization target and taking the filtering parameters of the at least three filters as optimization variables; and
regulating the filtering parameters of the at least three filters according to the optimization function.

5. The method of claim 1, wherein the filtering, by filters among the at least three filters other than the one filter, the audio signals using the filtering parameters to at least adjust the phases of the audio signals comprises:
filtering the audio signals using the filtering parameters, to adjust wave peaks of the audio signals to superimpose in the direction indicated by the direction information, and adjust the wave peaks and wave troughs of the audio signals to superimpose in a direction other than the direction indicated by the direction information to reduce an intensity of the signals.

6. The method of claim 1, wherein the filtering, by filters among the at least three filters other than the one filter, the audio signals using the filtering parameters to at least adjust the phases of the audio signals comprises:
filtering the audio signals using the filtering parameters to adjust the phases and amplitudes of the audio signals.

7. The method of claim 6, wherein the filtering the audio signals using the filtering parameters to adjust the phases and the amplitudes of the audio signals comprises:
filtering the audio signals using the filtering parameters, to adjust wave peaks of the audio signals to superimpose in the direction indicated by the direction information, and adjust the wave peaks and wave troughs to superimpose in a direction other than the direction indicated by the direction information to offset each other.

8. The method of claim 1, wherein four or more loudspeakers are disposed around the mobile terminal.

9. The method of claim 1, wherein the filters comprise a finite impulse response (FIR) filter.

10. The method of claim 1, further comprising:
obtaining image information;
determining, according to the image information, a facial direction of a target object; and
wherein the setting the direction information of the target sound field comprises:
setting the facial direction of the target object as the direction information of the target sound field.

11. A mobile terminal implementing the method of claim 1, comprising the at least three loudspeakers and the at least three filters, wherein the mobile terminal is configured to control the superimposed signal to form a target sound field in the direction indicated by the direction information with wave peaks superimposed, and wave troughs offset each other in a non-designated direction, such that no sound field is formed or the sound field is weakened in the non-designated direction.

12. A device for controlling a sound field, applied to a mobile terminal having at least three loudspeakers and at least three filters, the device comprising:
a processor; and
a memory storing instructions executable by the processor,
wherein the processor is configured to:
set direction information of a target sound field;
determine, according to the direction information, filtering parameters of the at least three filters of the mobile terminal, wherein the at least three filters have a one-to-one correspondence with the at least three loudspeakers, and are configured to filter audio signals to be output;
enable one of the at least three filters of the mobile terminal to perform denoising processing on the audio signal by controlling the filtering parameter of the filter, to enable the loudspeaker corresponding to the filter not to output the audio signal;
enable filters among the at least three filters other than the one filter to filter the audio signals using the filtering parameters, to at least adjust phases of the audio signals; and
enable the at least three loudspeakers of the mobile terminal to output the adjusted audio signals, wherein the audio signals output by the at least three loudspeakers are superimposed, and the superimposed signal is consistent with a direction indicated by the direction information.

13. The device of claim 12, wherein the processor is further configured to:
determine, according to the direction information, time delays of the at least three filters, to perform delay processing on the audio signals inputted into the at least three filters.

14. The device of claim 13, wherein the processor is further configured to:
enable the other filters among the at least three filters, according to the time delays, the audio signals to at least adjust the phases of the audio signals.

15. The device of claim 14, wherein the processor is further configured to:
construct an optimization function with taking the direction information as an optimization target and taking the filtering parameters of the at least three filters as optimization variables; and
regulate the filtering parameters of the at least three filters according to the optimization function.

16. The device of claim 12, wherein the processor is further configured to:
enable the other filters among the at least three filters to filter the audio signals using the filtering parameters, to adjust wave peaks of the audio signals to superimpose in the direction indicated by the direction information, and adjust the wave peaks and wave troughs of the audio signals to superimpose in a direction other than the direction indicated by the direction information to reduce an intensity of the signals.

17. The device of claim 12, wherein the processor is further configured to:
enable the other filters among the at least three filters to filter the audio signals using the filtering parameters to adjust the phases and amplitudes of the audio signals.

18. The device of claim 17, wherein the processor is further configured to:
enable the other filters among the at least three filters to filter the audio signals using the filtering parameters, to adjust wave peaks of the audio signals to superimpose in the direction indicated by the direction information, and adjust the wave peaks and wave troughs to superimpose in a direction other than the direction indicated by the direction information to offset each other.

19. The device of claim 12, wherein the processor is further configured to:
obtain image information;
determine, according to the image information, a facial direction of a target object; and
set the facial direction of the target object as the direction information of the target sound field.

20. A non-transitory computer readable storage medium, wherein instructions stored in the non-transitory storage medium, when executed by a processor of a mobile terminal device, enable the mobile terminal device to perform operations of:
setting direction information of a target sound field;
determining, according to the direction information, filtering parameters of at least three filters of the mobile terminal device, wherein the at least three filters have a one-to-one correspondence with at least three loudspeakers of the mobile terminal device, and are configured to filter audio signals to be output;
performing, through one of the at least three filters of the mobile terminal device, denoising processing on the audio signal by controlling the filtering parameter of the filter, to enable the loudspeaker corresponding to the filter not to output the audio signal
filtering, through filters among the at least three filters other than the one filter, the audio signals using the filtering parameters, to at least adjust phases of the audio signals; and
outputting, through the at least three loudspeakers of the mobile terminal device, the adjusted audio signals, wherein after the audio signals output by the at least three loudspeakers are superimposed, the superimposed signal is consistent with a direction indicated by the direction information.

* * * * *